Patented Aug. 8, 1933

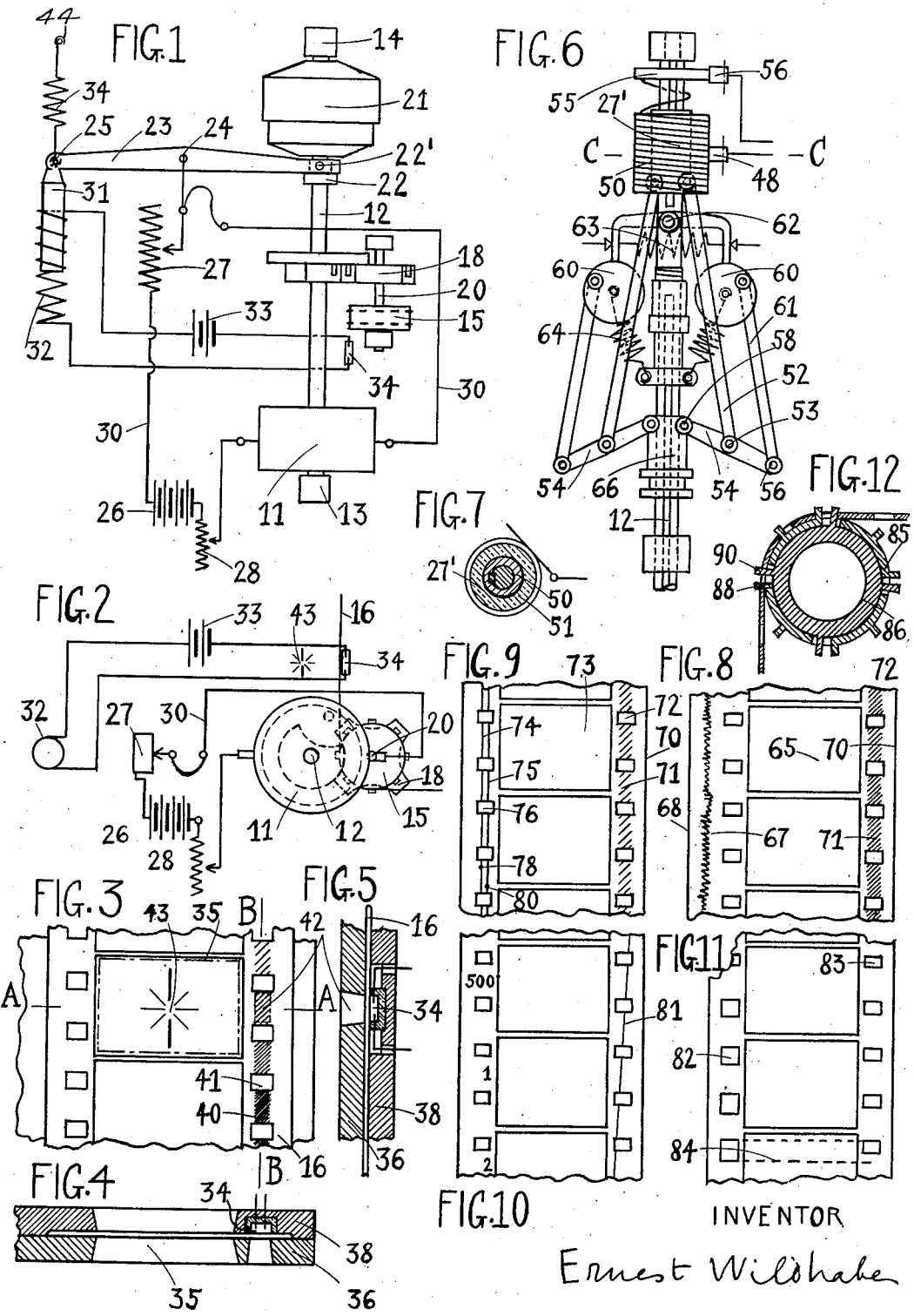

1,921,494

UNITED STATES PATENT OFFICE 1,921,494

METHOD OF PRODUCING AUDIBLE PICTURES

Ernest Wildhaber, Brooklyn, N. Y.

Application April 21, 1927. Serial No. 185,514

14 Claims. (Cl. 88—16.2)

The present invention relates to methods of producing coordinated moving pictures and sound, that is to say to methods of producing audible pictures, such as talking pictures, singing pictures and musical pictures.

One object of the present invention is to provide a method for producing audible pictures, which facilitates the initial steps, namely filming the picture and producing a master record.

A further object is to devise a method giving better results, and overcoming present limitations.

A further aim is to provide a method of the character indicated, for obtaining new kind of operas and dramas.

Another object is to provide a method for reproducing audible pictures at a rate changing automatically according to a predetermined schedule.

Other aims will be apparent in the course of the specification and from recital of the appended claims.

The invention is exemplified in the accompanying drawing, in which

Fig. 1 is a diagrammatic plan view of a device operating in accordance with the present invention.

Fig. 2 is a diagrammatic front elevational view corresponding to Fig. 1.

Fig. 3 is a view of a picture film adjacent the projection window and of adjacent stationary parts, including means for automatically governing the speed of reproduction in accordance with a preferred embodiment of my invention.

Fig. 4 and Fig. 5 are sections along lines A—A and B—B respectively of Fig. 3.

Fig. 6 is a diagrammatic plan view of a device for automatically changing the speed of reproduction, differing from the device indicated in the Figures 1 and 2.

Fig. 7 is a diagrammatic section along lines C—C of Fig. 6.

Figs. 8, 9, 10, 11 are partial views of picture films, containing signs of various forms, for automatically changing the speed of reproduction, or broadly for effecting automatic changes.

Fig. 12 is a section through two toothed members, bearing on forward side and on reverse side respectively of the holes of the film shown in Fig. 11, illustrative of a purely mechanical way of automatically changing the speed of reproduction.

Hitherto audible pictures were reproduced as a copy of an original performance, and the efforts centered in effecting coincidence of pictures and sound as completely as in the original performance. The utmost which could be done in this manner, is an accurate reproduction. The limitations of the original performance will naturally be kept in the reproduction.

The present silent moving pictures are made by shooting scenes, in which directions can be freely given in a loud voice. If these directions are suppressed, many more rehearsals are necessary. If moreover the actors have to speak or sing predetermined parts in addition to their acting, these parts must be well memorized and rehearsed too. The performance then loses to a substantial extent the freedom of the present moving pictures and undergoes many of the limitations of a stage play.

In present day silent moving pictures the same scene is filmed several times, and only the best is selected.

If in an audible picture, made after an original performance, only those scenes are selected in which acting is perfect, and of the so selected scenes only those are kept, where the vocal part is perfect too, then every scene must be repeated many more times. If it takes $n$ scenes to select a perfect one with respect to acting, and if it takes $m$ scenes to furnish one perfect vocal scene, then the total number of scenes required to give one scene, which is perfect in either respect, is $n$ times $m$.

According to the present invention the picture scenes and the corresponding vocal scenes are filmed and recorded respectively at different times, and the vocal scenes may be played by different persons. This procedure naturally makes it easier to obtain perfect results, for in the above example the number of scenes required to give one perfect scene is $n$ silent picture scenes plus $m$ purely vocal scenes, instead of $n$ times $m$ complete scenes. Moreover according to the present invention means are provided for obtaining synchronism while avoiding distortion of sound.

When filming the pictures and recording sound at different times, even when producing sound in view of the completed pictures, or when filming the pictures while the completed sound record is being played, certain discrepancies in synchronism will usually occur, which would be felt disagreeably by the audience. To eliminate such lacks of synchronism, the pictures and sound are synchronized, that is to say the picture film and the sound record are so displaced locally with respect to each other, that sound coincides accurately with the picture. Preferably the original sound record or master record is transmitted or transformed into a secondary record which will reproduce sound in synchronism with the picture, when turned in exact proportion with the feed of the picture film. This secondary record contains certain parts protracted, as compared with the master record and other parts contracted. Equal distances of the master record correspond to slightly changing distances of the secondary record. In other words sound is recorded on the secondary record at a changing rate as compared with the master record.

One way of obtaining the secondary record is by reproducing sound from the master record at the exact rate it has been recorded and by projecting the pictures at a changing rate, said rate being so changed that synchronism is effected. Sound is then recorded on a secondary record, whose speed is in the exact proportion to the changing rate of projection.

In speaking of a rate or speed of projection, I refer to the speed of the constant feed sprockets of the projection mechanism, or also to the speed of the shaft which contains the centrifugal governor (shaft 12 in Fig. 1), and not to the periodically changing speed of the known intermittent motion.

Frequently the picture film itself contains the secondary record, sound being recorded directly on the picture film in known manner.

When the pictures and the secondary record are reproduced at a constant speed, pictures and sound will be synchronized, but it will be found that sound will be reproduced in a distorted manner, alternately higher and lower than its original, owing to its reproduction at a changing rate as compared with its original. The effect is the same as when a phonograph plate is made to undergo fluctuations in speed, and is known to affect the pitch of the sound.

In other words, when playing the secondary record at a constant speed, then the wave length of sound will be changed in parts, that is to say the number of oscillations per second will be different from the number of oscillations of the original sound. Such differences are quickly noticeable, and pronouncedly so if music or song is being reproduced.

In order to eliminate distortions of sound, the pictures and the said synchronized secondary record are played at a slightly changing speed according to the present invention, the speed being so changed that sound is reproduced at the exact rate it has been recorded.

The pictures will then be reproduced at a slightly changing rate as compared with the rate of filming, but such slight changes are hardly noticeable and are not felt as a disturbance. The human organism lacks the means to judge speed within a few percent, whereas the human ear is capable of noticing comparatively finer differences in sound.

Preferably the changing speed used in synchronizing and in obtaining the said secondary record is automatically marked on the picture film. Moreover in the final reproduction the speed of the synchronized pictures and sound is automatically changed in accordance with the signs or marks on the picture film, to obtain the same changing speeds as were used in producing said secondary record. This will be explained with more detail hereafter.

The present invention also opens up a new field of audible pictures.

At present the persons taking part in spoken drama or opera should combine many prominent faculties at once. They should possess good looks and should be good actors to satisfy the eye, they should possess a good memory in order not to fall out of their roles, either visible or audible, and they should be vocal artists at the same time.

These different qualities go hardly ever all together. According to the present invention the pictures may be filmed and sound recorded from different persons. In other words super beings may be created by combining the looks and acting of one person with the voice of another. This embodiment of the invention represents a special case of the broad idea of filming the pictures and recording sound at different times, for even if it would be tried to record sound at the same time the pictures are taken, an accurate and lasting coincidence could not be actually effected, when pictures are filmed of one person and corresponding sound is recorded from another. Synchronized pictures and sound, obtained from different sources, are preferably also played at a predetermined changing rate.

Means for automatically changing the speed of reproduction will now be described.

In the Figures 1 and 2 the numeral 11 denotes an electric motor imparting rotary motion to a shaft 12 which is journalled in two bearings 13 and 14. Shaft 12 operates the whole feed mechanism of the synchronized pictures and sound. Only the intermittent feed sprocket 15 of this feed mechanism is shown. It is of known type, having teeth engaging with holes of the picture film 16, and is driven from shaft 12 by means of a pin, which engages the guide ways of Maltese cross 18 in known manner. Maltese cross 18 and sprocket 15 are keyed to the same shaft 20.

Shaft 12 carries also a centrifugal governor 21 of suitable known structure. The axially moveable sleeve 22 of governor 21 acts on one end of a lever 23, whose central point 24 operates a variable electric resistance 27. If end point 25 of lever 23 would be fixed, then governor 21 would alone regulate resistance 27 of the electric circuit imparting power to motor 11, and keep the speed constant or substantially constant. Voltage is applied to this circuit from a source giving least possible fluctuations, such as electric battery 26. The shown circuit comprises battery 26, motor 11, automatically changeable resistance 27, and a variable resistance 28 operated by hand, in addition to wires 30.

Point 25 of lever 23 is connected with a moveable core 31 engaging a coil 32 of another electric circuit. Voltage is applied to this circuit by a battery 33. This circuit contains a light sensitive cell 34 of any suitable known form, disposed on one side back of the picture film 16. Its operation will be explained with reference to Figs. 3–5. Picture film 16 passes window or opening 35 through which it is projected, and is guided by two members 36, 38 which form a slot for passage of the film. In Fig. 3 the film is show with front member 36 removed. Film 16 contains on one side a broadened line or ribbon 40 of changing transparence, preferably passing through the row of holes 41. The changing transparence is indicated in Fig. 3 by shading applied at a changing density. The transparence is changed in conformity with the changing speed desired during the reproduction of pictures and sound. A small opening 42 is provided in member 36, which opening covers the space intermediate two adjacent holes, and a width equal to or smaller than the width of ribbon 40. Light (indicated diagrammatically at 43) from the same source as used for projecting the pictures is projected through window 42. More or less light will reach sensitive cell 34, depending on the changing transparence of ribbon 40. In correspondence therewith the electric resistance of sensitive cell 34 will fluctuate and with it the current in the secondary circuit. Coil 32 will in accordance herewith exert changing forces on core 31 and changing positions of equilibrium of point 25 will be arrived at. The point 25 will continue to change its position, until equilibrium is attained between the magnetic forces exerted upon core 31 and the elastic forces exerted by a spring 44 or systems of springs secured to a fixed point 45. Lever 23 is therefore operated under double influence, namely under the influence of centrifugal governor 21 and under the influence of coil 32, which latter attributes to point 25 a predetermined position for every degree of transparence of ribbon 40, that is also for every speed intended during reproduction.

The operation of the device is as follows:

If the transparence of ribbon 40 changes in a considered moment so as to indicate an increase in speed, then point 25 will be moved downward, the core 31 being drawn further into the coil 32. Lever 23 then moves at first as if point 22' would be fixed, and point 24 moves downward also, decreasing the resistance at 27. The electric current in the primary circuit is hereby increased and the speed of motor 11 gradually increases. Sleeve 22 of governor 21 then moves up, moving point 24 up too. The governor is so selected, that a new equilibrium will be attained when the final position of point 24 is still below the original position, while the motor runs at the desired predetermined speed.

Before starting a picture or when starting it, film may be used, if so desired, which contains ribbon 40 of a predetermined constant transparence, which corresponds to a fixed speed. While the speed of the device is measured, the resistance 28 is changed by hand until the fixed speed is maintained without acceleration. Then the device is left to its automatic operation.

When in the foregoing it has been referred to synchronism, it is understood that this is to be taken within the practical meaning of the word. If a single loudspeaker is used in reproduction, I preferably advance the reproduction of sound as compared with the pictures by a small amount, such as for instance a tenth of a second, to compensate for the time required by the sound in travelling and reaching the ear of the main body of the audience.

In the device shown in Fig. 1 and Fig. 2, the variable resistance 27 and the contact member are relatively stationary, unless resistance is just being changed. For starting a change in resistance a comparatively considerable force is required as a result of the considerable friction.

The device indicated in Fig. 6 and Fig. 7 operates with a minimum of friction by providing a resistance 27' which is continuously rotated relatively to its brush 48, so that the friction opposes the positive rotary motion, and opposes only to a small extent axial movement of resistance 27', that is the movement which effects the change in resistance.

Resistance 27 is in the form of a cylindrical coil, which is coaxial with shaft 12. It is fastened to a sleeve 50 by means of insulation 51. Sleeve 50 is moveable in splines of shaft 12 in the direction of its axis and its axial position is controlled by rods 52 attached at points 53 to levers 54.

The electric current passes from brush 48 to coil 27', whose one end is connected by means of a flexible wire with a cylindrical disk 55. The current passes through said wire and disk to a stationary brush 56. Disk 55 naturally is also insulated from shaft 12.

The position of levers 54 is determined by the location of points 56 and 58. The points 56 are connected with centrifugal weights 60 by means of rods 61. These weights are pivoted on a center 62 and are drawn towards the axis of rotation by means of springs 63, 64, which are preferably adjustable.

The pivots 58 of levers 54 are secured to a sleeve 66 which is axially moveable in splines of shaft 12, and which may be operated from any outside source, such as from a secondary circuit comprising a light sensitive cell.

Sound may be recorded in known manner either on the picture film directly, or on a separate record preferably of strip form, operated in exact proportion to the operation of the picture film.

Fig. 8 indicates a film containing pictures at 65 and having sound recorded on one side. A film of additional width may be provided, as indicated, or sound may be recorded on a film of standard width while the size of the picture is correspondingly reduced. Sound may be recorded in known manner along a line or ribbon of changing transparence, or along a line 67 shown in an exaggerated manner, the line 67 being substantially straight and extending parallel to side 68 of the film. This film, as well as the film shown in Fig. 9 contain on their sides 70 a ribbon 71 of changing transparence, for automatically providing changes during reproduction. Ribbon 70 is seen to pass preferably across the holes 72. Film 73 of Fig. 9 differs from the film of Fig. 8 by having sound recorded in a different manner, without extra width being required, sound is recorded along two lines 74, 75, which extend lengthwise of the film and may pass across the holes 76. A point 78 of line 74 corresponds to a point 80 of line 75, reproduction being simultaneous at such shifted points. This provision assures continuous reproduction, inasmuch as reproduction continues along one line, when it is interrupted along the other.

Fig. 10 indicates a line 81 in place of ribbon 71. The location of line 81 on the width of the film furnishing the information previously given by changing transparence of ribbon 71. Speed may be changed in accordance with the location of line 81. The speed of reproduction may be changed in a completely mechanical manner with the use of a film as indicated in Fig. 11, which expresses variations of speed with variations of the length of the holes 82. Holes 83 are standard, and so are the upper ends of holes 82. The lower ends of these holes are placed at changing distances from the upper ends. The holes at the upper end of the film are shown of equal length, whereas the holes of the lower end have a different length, as indicated by dotted line 84.

Displacement corresponding to the changing length of holes 82 may be obtained by two concentric members 85, 86, see Fig. 12, whose teeth 88, 90 bear against the forward sides and the reverse sides of the holes 82 respectively. The relative turning motion of the two members 85, 86 may then be transmitted in known manner to sleeve 66 (Fig. 6).

It is understood that such changes and modifications may be made in my invention without departing from its spirit, as fall within the limits of the appended claims.

What I claim is:

1. In a device for producing audible pictures, a picture record, a sound record, means for reproducing said records, means for jointly changing the rate of reproduction of both said records, an element containing marks for governing said rate of reproduction, and an operative connection between said marks and said means for changing the rate of reproduction.

2. In a device for producing audible pictures, a picture carrier, a sound record, means for reproducing pictures and sound at a constant speed ratio, means for jointly changing the speed of reproduction of said pictures and sound so as to leave said ratio unaffected, an element containing marks for governing said speed of reproduction, and an operative connection between said marks and said means for changing the speed of reproduction.

3. In a device for producing audible pictures, a picture carrier, a sound record, means for reproducing pictures and sound at a constant speed ratio, means for jointly changing the speed of reproduction of said pictures and sound, marks disposed on said picture carrier for governing said speed of reproduction, and an operative connection between said marks and said means for changing the speed of reproduction.

4. In a device for producing audible pictures, a picture carrier, a sound record, means for reproducing pictures and sound in timed relation, means for jointly changing the speed of reproduction of said pictures and sound, marks disposed on said picture carrier for governing said speed of reproduction, a light sensitive element, means for admitting light to said marks and from said marks to said light sensitive element, and an electric circuit connected with said light sensitive element and operatively connected with said means for changing said speed of reproduction.

5. In a device for producing audible pictures, a picture carrier, a sound record contained on said picture carrier, means for reproducing pictures and sound, driving means, a centrifugal speed governor operatively connected with the last named means, marks disposed on said picture carrier for governing the speed of reproduction, a light sensitive element, means for admitting light to said marks and from said marks to said light sensitive element, and an electric circuit connected with said light sensitive element and operatively connected with said speed governor.

6. In a device for producing audible pictures, a picture record containing two rows of holes for feeding said record, a sound record, means for reproducing said records, means for changing the rate of reproduction of at least one of said records, marks contained on the picture record intermediate said holes of a row for governing said rate of reproduction, a light sensitive element, means for admitting light to said marks and from said marks to said light sensitive element, and an electric circuit connected with said light sensitive element and operatively connected with said means for changing the rate of reproduction.

7. In a device for producing audible pictures, a picture record containing two rows of holes for feeding said record, a sound record, means for reproducing said records, means for changing the rate of reproduction of at least one of said records, a ribbon of changing transparence extending intermediate said holes of a row for governing said rate of reproduction, a light sensitive element, means for transmitting light through said ribbon of changing transparence to said light sensitive element, and an electric circuit connected with said light sensitive element and operatively connected with said means for changing the rate of reproduction.

8. In a device for producing audible pictures, a picture carrier, a sound record, means for reproducing pictures and sound in timed relation, means for changing the rate of reproduction of said pictures and sound, a light sensitive element, means for admitting light to said element, means for varying the intensity of the admitted light, and an electric circuit connected with said element and operatively connected with said means for changing the rate of reproduction.

9. In a device for producing audible pictures, a picture record, a sound record, means for reproducing said records, means for changing the rate of reproduction of at least one of said records, marks contained on the picture record for governing said rate of reproduction, a light sensitive element, means for admitting light to said marks and from said marks to said light sensitive element, and an electric circuit connected with said element and operatively connected with said means for changing the rate of reproduction.

10. The method of producing audible pictures, which consists in filming pictures and recording sound at different times, in thereby obtaining a picture record and an original sound record, in playing the original sound record at the same speed at which it has been recorded and in simultaneously playing the picture record at a gradually changing speed adapted to the sound reproduction, in transmitting the original sound record to another sound record which is moved at a constant speed ratio with respect to said picture record, in providing a speed record indicative of said changing speed, in reproducing said pictures at said gradually changing speed by means of said speed record, and in reproducing the sound recorded on said other sound record at said constant speed ratio with respect to the picture record.

11. The method of producing audible pictures, which consists in filming pictures and recording sound at different times, in thereby obtaining a picture record and an original sound record, in playing said original sound record at the same speed at which it has been recorded and in simultaneously playing the picture record at a gradually changing speed adapted to the sound reproduction, in transmitting the original sound record to another sound record on the picture carrier which is movable at said gradually changing speed, in providing a speed record on said picture carrier, and in reproducing said pictures and sound at said gradually changing speed by means of said speed record.

12. A film containing a picture record and a sound record, said sound record being synchronized with said picture record and containing condensed as well as protracted portions as compared with the original sound record, and signs provided on said film and indicative of the varying speed of reproduction required to reproduce the original pitch of sound.

13. A film containing a picture record and a sound record, said sound record being synchronized with said picture record and containing condensed as well as protracted portions as compared with the original sound record, holes provided on the sides of said film for moving said film, and a ribbon of changing transparence extending intermediate the individual holes of a side and indicative of the varying speed of reproduction required to reproduce the original pitch of sound.

14. The method of producing audible pictures, which consists in filming pictures and recording sound at different times, in thereby obtaining a picture record and an original sound record, in playing said records, in improving synchronism between said records during the aforesaid playing operation by gradually varying the speed of said picture record relatively to the speed of said original sound record, in making another sound record adapted to be played at a constant speed ratio with respect to said picture record, in making a speed record indicative of said varying speed, and in reproducing the synchronized pictures and sound at said constant speed ratio and at a speed corresponding to said varying speed, so that the original pitch of sound is reproduced.

ERNEST WILDHABER.